(12) United States Patent
Lund

(10) Patent No.: US 7,006,452 B2
(45) Date of Patent: Feb. 28, 2006

(54) MATCHING DSL DATA LINK LAYER PROTOCOL DETECTION

(75) Inventor: Sven O. Lund, Holte (DK)

(73) Assignee: Intel Corporation, Santa Clara, CA (US)

(*) Notice: Subject to any disclaimer, the term of this patent is extended or adjusted under 35 U.S.C. 154(b) by 980 days.

(21) Appl. No.: 09/861,895

(22) Filed: May 22, 2001

(65) Prior Publication Data

US 2002/0176365 A1 Nov. 28, 2002

(51) Int. Cl.
*H04L 12/28* (2006.01)
*H04J 3/12* (2006.01)

(52) U.S. Cl. .................. 370/254; 370/252; 370/524
(58) Field of Classification Search ........ 370/252–254, 370/465–469, 524
See application file for complete search history.

(56) References Cited

U.S. PATENT DOCUMENTS

| | | | | |
|---|---|---|---|---|
| 6,108,350 | A * | 8/2000 | Araujo et al. | 370/467 |
| 6,122,287 | A * | 9/2000 | Ohanian et al. | 370/524 |
| 6,631,120 | B1 * | 10/2003 | Milbrandt | 370/252 |
| 6,778,505 | B1 * | 8/2004 | Bullman et al. | 370/254 |

* cited by examiner

*Primary Examiner*—Steven Nguyen
(74) *Attorney, Agent, or Firm*—Kacvinsky LLC

(57) ABSTRACT

An arrangement is provided for detecting a matching DSL data link layer protocol. A matching-protocol detection mechanism is triggered under certain condition. The matching-protocol detection mechanism, once triggered, detects a matching protocol from at least one initiating protocol. The matching protocol is supported by both a customer premise equipment and a digital subscriber line access module and is used by both to establish a DSL connection. When the matching protocol is successfully identified, it is activated. When the matching protocol is not found, a failure is reported.

6 Claims, 8 Drawing Sheets

MATCHING DSL DATA LINK LAYER PROTOCOL DETECTION

RESERVATION OF COPYRIGHT

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

BACKGROUND

Aspects of the present invention relate to Digital Subscriber Line (DSL). Other aspects of the present invention relate to establishing a DSL connection.

In today's highly competitive telecommunication market, new services with varying levels of grades are offered everyday. Alternatives to the conventional telephony include Internet services with narrow band or broad band options. Digital Subscriber Line (DSL) provides an alternative to broadband Internet services using conventional telephone lines.

To received DSL service, a customer premise equipment (CPE) must be installed at a user's premise. Through the CPE, the user can establish a DSL connection with a central office via a DSL Access Module (DSLAM) installed at the central office. The CPE at the user's site and the DSLAM at the central office establish a DSL connection by communicating with each other via a DSL data link layer protocol. Examples of such a protocol include High-level Data Link Control (HDLC, International Organization for Standardization, ISO/IEC 3309:1993(E)), Asynchronous Transfer Mode layer specification (ATM cell, International Telecommunication Union, ITU-T Recommendation I.361 (February 1999)-B-ISDN ATM Layer Specification, located at http://www.itu.int/itudoc/itu-t/rec/i/s_i361.htm), Asynchronous Transfer Mode Forum, and Frame-based User-Network Interface (ATM FUNI, The ATM Forum Technical Committee, defined in Frame Based User-To-Network Interface Specification v2.0, AF-SAA-0088.000, July 1997, located at ftp://ftp.atmforum.com/pub/approved-specs/af-saa-0088.000.pdf). Most DSLAM vendors support more than one DSL data link layer protocols.

The DSL data link layer protocol used between a particular CPE and a DSLAM is usually defined via DSL data link layer protocol provisioning when a user initially subscribes the service. Once a DSL data link layer protocol is chosen to facilitate the communication between a particular CPE and the DSLAM, it is used whenever a DSL connection needs to be established. That is, when the user associated with the CPE requests DSL service, the CPE and the DSLAM rely on the DSL data link layer protocol agreed during the DSL data link layer protocol provisioning to facilitate the requested service.

One problem associated with this pattern of operation is that a mismatch in DSL data link layer protocol may occur between the CPE and the DSLAM. The mismatch may be due to different reasons. For example, it may be caused by a simple configuration error at the central office. The mismatch may also occur when either the DSLAM at the central office or the CPE at user's site is upgraded (e.g., to support more advanced DSL data link layer protocols). When a mismatch occurs, the DSL connection can not be established because the CPE and the DSLAM will not be able to communicate. In this case, the service is not delivered and overall service quality degrades.

Available solution to this problem is to perform a manual trial-and-error trouble-shooting on all possible DSL data link layer protocols until successful link synchronization is achieved. Such a manual solution is, although technologically trivial, time consuming and costly.

BRIEF DESCRIPTION OF THE DRAWINGS

The present invention is further described in terms of exemplary embodiments which will be described in detail with reference to the drawings. These embodiments are non-limiting exemplary embodiments, in which like reference numerals represent similar parts throughout the several views of the drawings, and wherein.

DETAILED DESCRIPTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

The processing described below may be performed by a general-purpose computer alone or in connection with a special purpose computer. Such processing may be performed by a single platform or by a distributed processing platform. In addition, such processing and functionality can be implemented in the form of special purpose hardware or in the form of software being run by a general-purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

The inventions described herein address establishing a DSL connection using a DSL data link layer protocol supported on both ends of the connection. FIGS. 1 to 4 show the high level system configurations of different and exemplary embodiments of the present invention, in which the DSL data link layer protocol used to establish a DSL connection is selected automatically through a matching-protocol detection mechanism.

Figure 1:
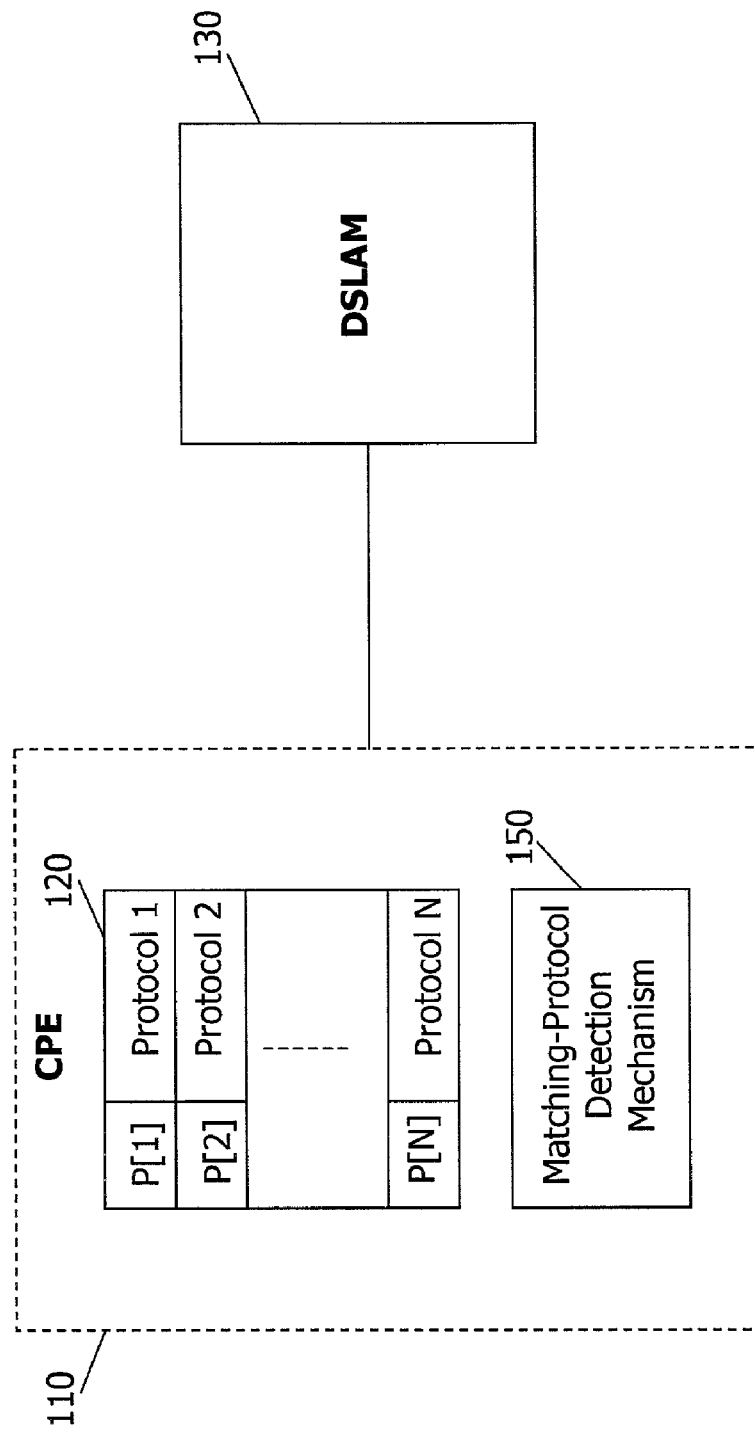
FIG. 1 is a high level system architecture of one embodiment of the present invention, in which a DSL data link layer protocol is detected by a matching-protocol detection mechanism in a customer premise equipment.

FIG. 1 is a high level system architecture of one embodiment of the present invention, in which a DSL data link layer protocol is detected by a matching-protocol detection mechanism running on a Customer Premise Equipment (CPE). In FIG. 1, a system configuration 100 comprises a Customer Premise Equipment (CPE) 110, a first protocol list 120 stored in the CPE 110, representing all the protocols supported by the CPE 110, a matching-protocol detection mechanism 150, running on the CPE 110 and accessing the first protocol list 120, and a Digital Subscriber Line Access Module (DSLAM) 130 that may support multiple DSL data link layer protocols.

A DSL connection between a user (not shown in FIG. 1) and a central office (not shown in FIG. 1) may be established via the CPE 110 and the DSLAM 130. The user is connected to the CPE 110 and the DSLAM 130 is connected to the central office and may be physically located in the central office. To establish a DSL connection between a user and a central office, the CPE 110 and the DSLAM 130 communicates using certain protocol. Both the CPE 110 and the DSLAM 130 may support a plurality of DSL data link layer protocols. At any run time, an appropriate DSL data link layer protocol among a plurality of protocols supported by both the CPE 110 and the DSLAM 130 may be chosen as the DSL data link layer protocol to facilitate the communication between the CPE 110 and the DSLAM 130.

In the system 100, the first protocol list 120 records a plurality of N protocols supported by the CPE 110 and is stored in the CPE 110. For example, the first protocol list 120 may include Asynchronous Transfer Mode layer specification or ATM cell, ATM Frame-based User-Network Interface (FUNI), or High-level Data Link Control (HDLC). Each of the protocols in the first protocol list 120 may be listed in an individual position in the list that can be referenced using an index value. For example, the first protocol listed may be stored in a position indexed as P[1], the second protocol may be stored in P[2], etc. In the system 100, to establish a DSL connection, an appropriate DSL data link layer protocol is selected from the list 120 that is supported by both the CPE 110 and the DSLAM 130.

The appropriateness of the DSL data link layer protocol to be selected to establish a DSL connection may be determined according to certain criterion. Such a criterion may be set up based on application needs. For example, an appropriate DSL data link layer protocol may be defined as the first one in the list 120 that is supported by both the CPE 110 and the DSLAM 130. In the system 100, the identification of such a first matching protocol may be initiated on behalf of the CPE 110 with respect to the list 120. For example, the matching-protocol detection mechanism 150 may detect a matching protocol by testing, one by one, the DSL data link layer protocols recorded in the list 120.

The testing of a matching DSL data link layer protocol may be conducted in different fashions. For example, the matching-protocol detection mechanism 150 may detect a matching protocol in a round robin fashion. It may also perform the detection using other strategies. For instance, the matching-protocol detection mechanism 150 may optimize a protocol list so that the protocol stored in the first position (i.e., P[1]) is the best option at the time. In this way, the matching-protocol detection mechanism 150 can always try to match the best option first. When an existing best option becomes obsolete (due to, for example, upgrade of DSL service), an emerging best option may be detected and used to replace the previous best option at, for example, P[1].

Figure 2:
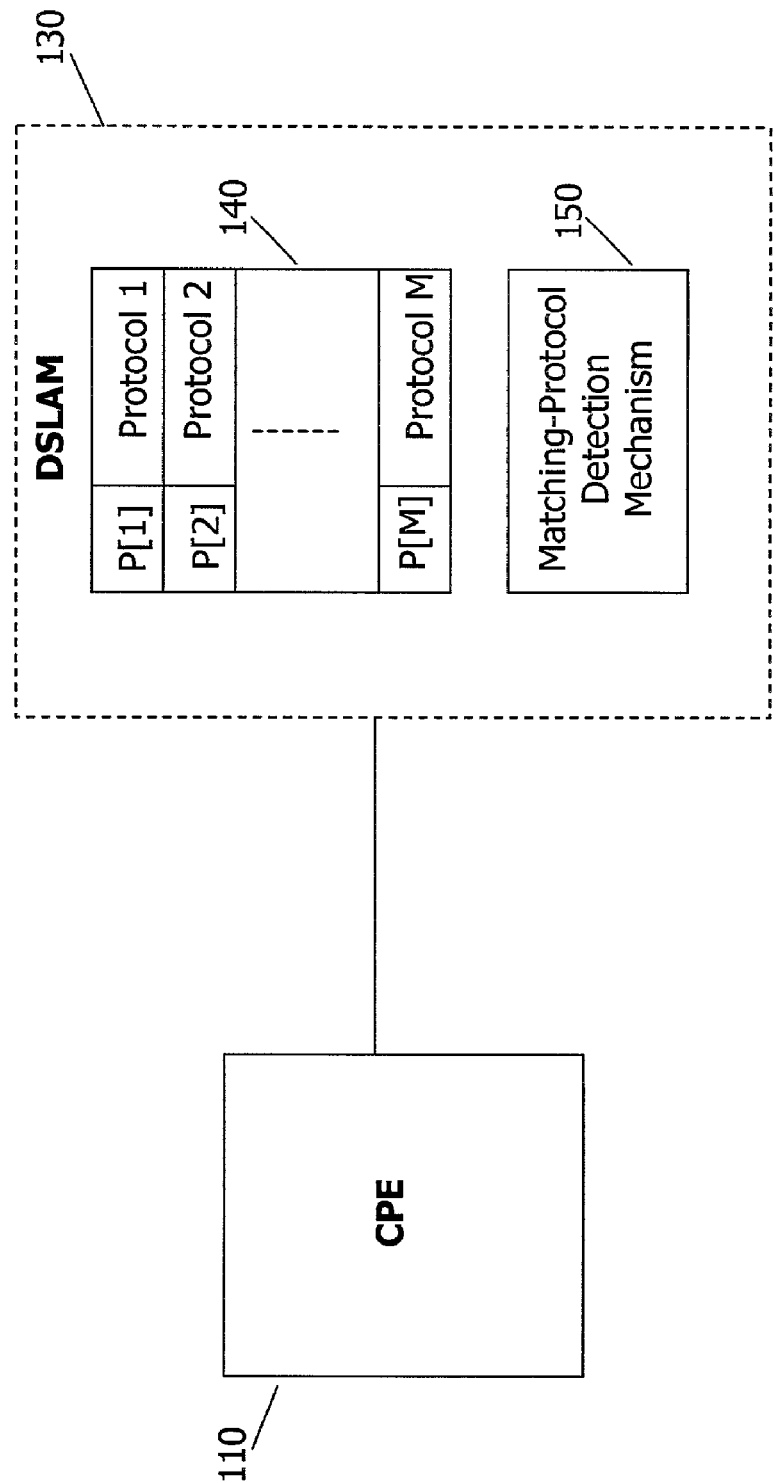
FIG. 2 is a high level system architecture of another embodiment of the present invention, in which a DSL data link layer protocol is detected by a matching-protocol detection mechanism in a DSL access module.

FIG. 2 is a high level system architecture of a different embodiment of the present invention, in which a matching DSL data link layer protocol is detected by a matching-protocol detection mechanism running on a DSL Access Module (DSLAM). In FIG. 2, a system configuration 200 comprises a Customer Premise Equipment (CPE) 110 that may support multiple protocols, a DSL Access Module (DSLAM) 130, a second protocol list 140, representing a plurality of M protocols supported by the DSLAM 130 and stored in the DSLAM 130, and a matching-protocol detection mechanism 150, running on the DSLAM 130 and accessing the second protocol list 140.

In the system 200, the matching-protocol detection mechanism 150 may perform protocol detection in a similar fashion as in system 100 except that the detection is executed within the DSLAM with respect to the list of M protocols supported by the DSLAM 130. With configuration 200, the matching-protocol detection mechanism 150 automatically selects a DSL data link layer protocol from the plurality of M protocols that is supported by both the DSLAM 130 and the CPE 110.

Figure 3:
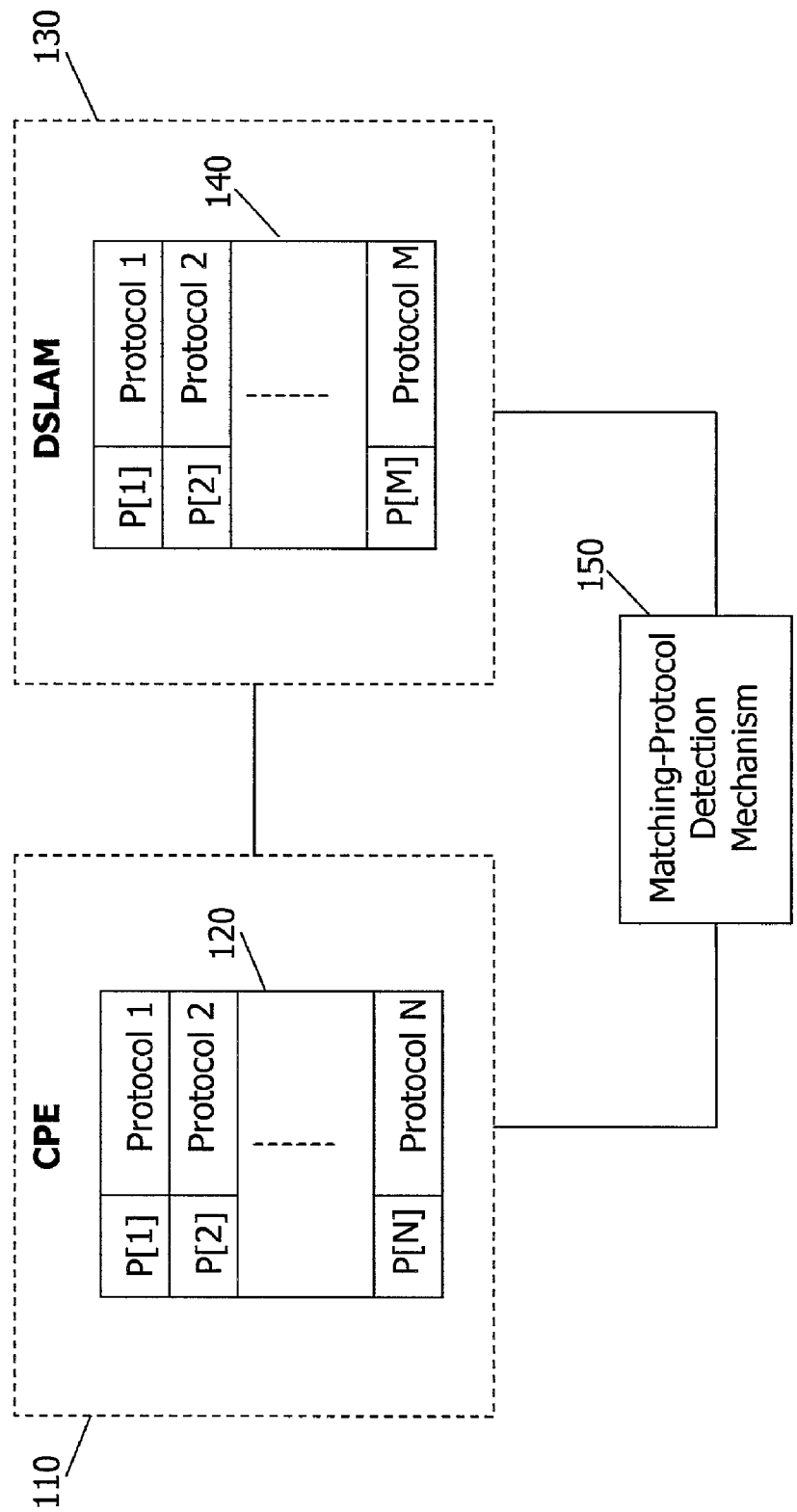
FIG. 3 is a high level system architecture of yet another embodiment of the present invention, in which a DSL data link layer protocol is detected by a stand-alone matching-protocol detection mechanism.

FIG. 3 is a high level system architecture of yet another different embodiment of the present invention, in which a DSL data link layer protocol is detected by a stand-alone matching-protocol detection mechanism connecting to both a CPE and a DSL Access Module (DSLAM). In FIG. 3, a system configuration 300 comprises a Customer Premise Equipment (CPE) 110, a first protocol list 120, representing all the protocols supported by the CPE 110 and stored in the CPE 110, a DSL Access Module (DSLAM) 130, a second protocol list 140, representing all the protocols supported by the DSLAM 130 and stored in the DSLAM 130, and a matching-protocol detection mechanism 150 connecting to both the CPE 110 and the DSLAM 130 to automatically detect a DSL data link layer protocol that is supported by both the CPE 110 and the DSLAM 130.

In the system 300, the matching-protocol detection mechanism 150 is a stand-alone mechanism and may be configured to function in different operating modes. For example, in one operating mode, it may perform matching protocol detection on behalf of the CPE 110. In a different operating mode, it may perform the detection on behalf of the DSLAM 130. When it operates on behalf of the CPE 110, it may initiate the matching protocol detection based on the first protocol list 120 stored in the CPE 110. When it operates on behalf of the DSLAM 130, it may initiate the matching protocol detection based on the second protocol list 140 stored in the DSLAM 130. The operating mode may be configured according to the needs when the matching-protocol detection mechanism 150 is deployed or may be reconfigured when the needs change.

Figure 4:
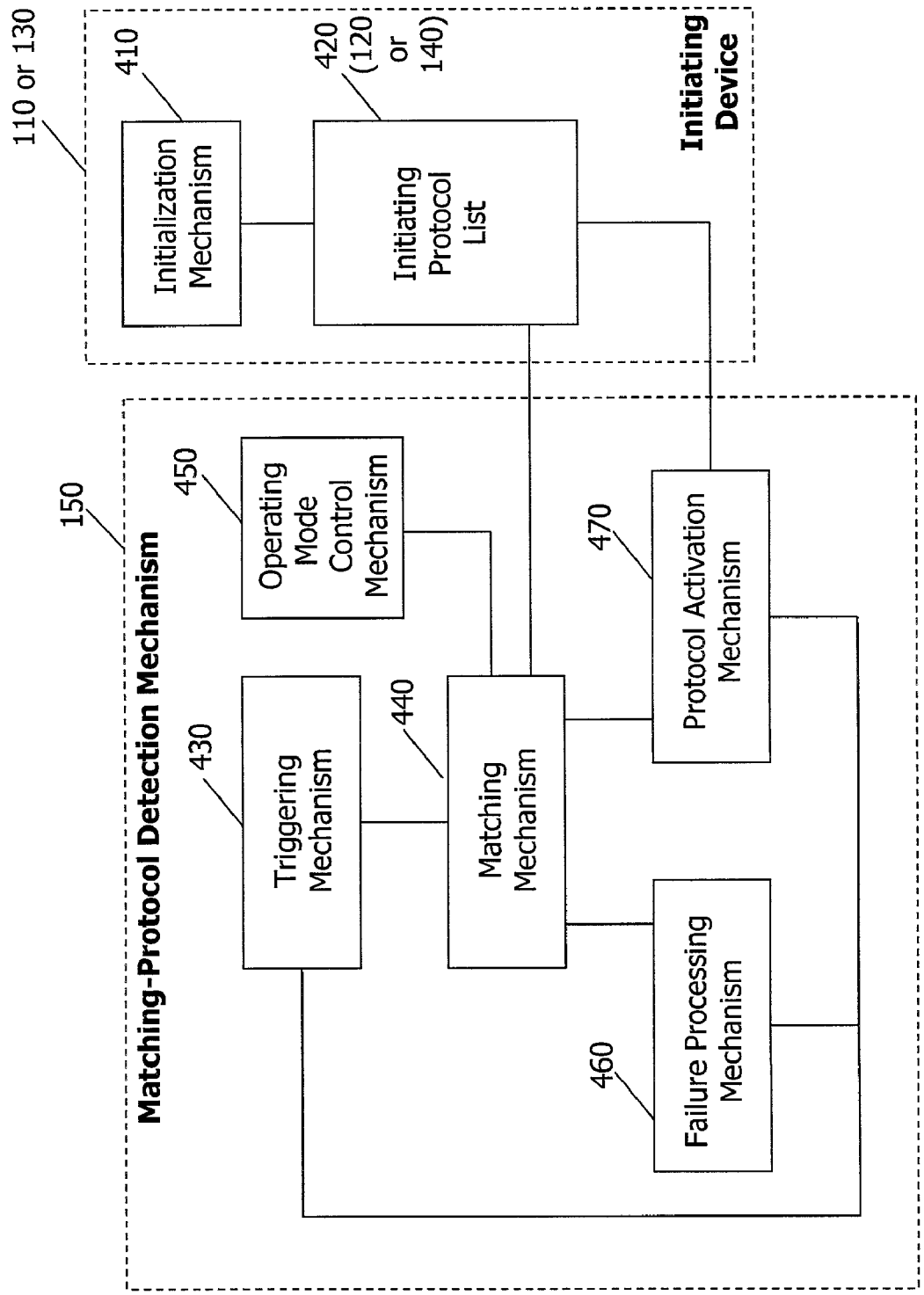
FIG. 4 depicts the internal structure of a matching-protocol detection mechanism and its relationship with an initiating protocol list.

FIG. 4 depicts the internal structure of the matching-protocol detection mechanism 150 and its relationship with an initiating protocol list 420. In FIG. 4, the matching-protocol detection mechanism 150 comprises a triggering mechanism 430, a matching mechanism 440, an operating mode control mechanism 450, a failure processing mechanism 460, and a protocol activation mechanism 470. The matching mechanism 440 detects a matching protocol based on the initiating protocol list 420.

The initiating protocol list 420 corresponds to either the first protocol list 120 or the second protocol list 140 (not both), depending on the operating mode of the matching-protocol detection mechanism 150 (whether it functions on behalf of the CPE 110 or the DSLAM 130). For example, when the matching-protocol detection mechanism 150 is configured to function on behalf of the CPE 110 (e.g., in the system 100 or in the system 300), the first protocol list 120 is the initiating protocol list. When the matching-protocol detection mechanism 150 is configured to function on behalf of the DSLAM 130 (e.g., in the system 200 or in the system 300), the second protocol list 140 is the initiating protocol list.

The operating mode of the matching-protocol detection mechanism 150 may be directly related to the configuration of the system (e.g., 100, 200, 300). For example, with the configuration 100, since the matching-protocol detection mechanism 150 resides in the CPE 110, it may be configured (e.g., as a default internal configuration) to operate using the first protocol list 120 as the initiating protocol list. With the configuration 200, since the matching-protocol detection mechanism 150 resides in the DSLAM 130, it may be configured (e.g., as a default internal configuration) to operate using the second protocol list 140 as the initiating protocol list. With the configuration 300, since the matching-protocol detection mechanism 150 stands alone, it may need to be explicitly configured to use one of the two protocol lists (120 or 140) as the initiating protocol list.

The device in which the initiating protocol list is stored is an initiating device. For example, if the first protocol list 120 is the initiating protocol list, the CPE 110 is the initiating device. If the second protocol list 140 is the initiating protocol list, the DSLAM 130 is the initiating device. The initiating protocol list 420 in FIG. 4 is set up by an initialization mechanism 410 of the initiating device.

A protocol list (120 or 140) associated with a device (CPE 110 or DSLAM 130) records the protocols that are supported by the device. Such a list may be updated in different situations. For example, it may be updated whenever a new matching protocol is detected. In this case, the protocols stored in the list may be re-arranged according to a different order so that the current matching protocol is always stored as the first choice (e.g., to optimize the efficiency of the detection). In addition, a protocol list may need to be updated whenever the protocols that the device supports change. For example, when a central office is upgraded to support more DSL data link layer protocols, the second protocol list 140 in the associated DSLAM 130 may be accordingly updated. When a protocol list is updated, the initialization mechanism in the device (CPE or DSLAM) may be invoked to re-initialize the corresponding protocol list.

In the example embodiment illustrated in FIG. 4, the operating mode of the matching-protocol detection mechanism 150 may be configured and controlled via the operating mode control mechanism 450. Such internal configuration may be executed prior to the deployment of the mechanism 150 and may be updated when the needs arise.

In FIG. 4, the matching mechanism 440 (that detects a matching protocol) is activated by the triggering mechanism 430. The triggering mechanism 430 may activate the matching mechanism 440 on different conditions. For example, when power is up (usually after a power down period) and the corresponding physical layer DSL connection is re-established, the triggering mechanism 430 may activate the matching mechanism 440 to re-identify the matching DSL data link layer protocol. In addition, when the physical layer connection is being re-activated after a period of deactivation (due to, for example, idle cycles or usage limit specified in a timer profiles), the matching DSL data link layer protocol may also need to be re-identified.

The matching mechanism 440, upon being activated by the triggering mechanism 430, performs protocol matching between its initiating device and the device on the other end of the DSL connection. For example, for a matching-protocol detection mechanism 150 operating for the CPE 110 (i.e., the initiating device is the CPE 110), its matching mechanism 440 may identify a matching protocol between the CPE 110 and the DSLAM 130 by testing each DSL data link layer protocol recorded in the first protocol list 120 (the initiating protocol list) to see whether the DSLAM 130 will respond properly. When a proper response to an initiated protocol test is received from the DSLAM 130 at the initiating device, a match is found.

In a different operating mode, the detection is performed in a reverse direction. For instance, the matching mechanism 440 may detect a matching DSL based on the protocol list 140 (initiating protocol list). In this case, the matching mechanism 440 tests each DSL data link layer protocol listed in the list 140 and monitors the response from the CPE 110. A matching is found when an initiated protocol received a correct response from the CPE 110.

When a matching protocol is identified, the protocol activation mechanism 470 is triggered, which may activate the detected matching protocol and update the initiating protocol list. When a matching protocol is not found, the failure processing mechanism 460 is triggered that generates appropriate message or report.

Figure 5:
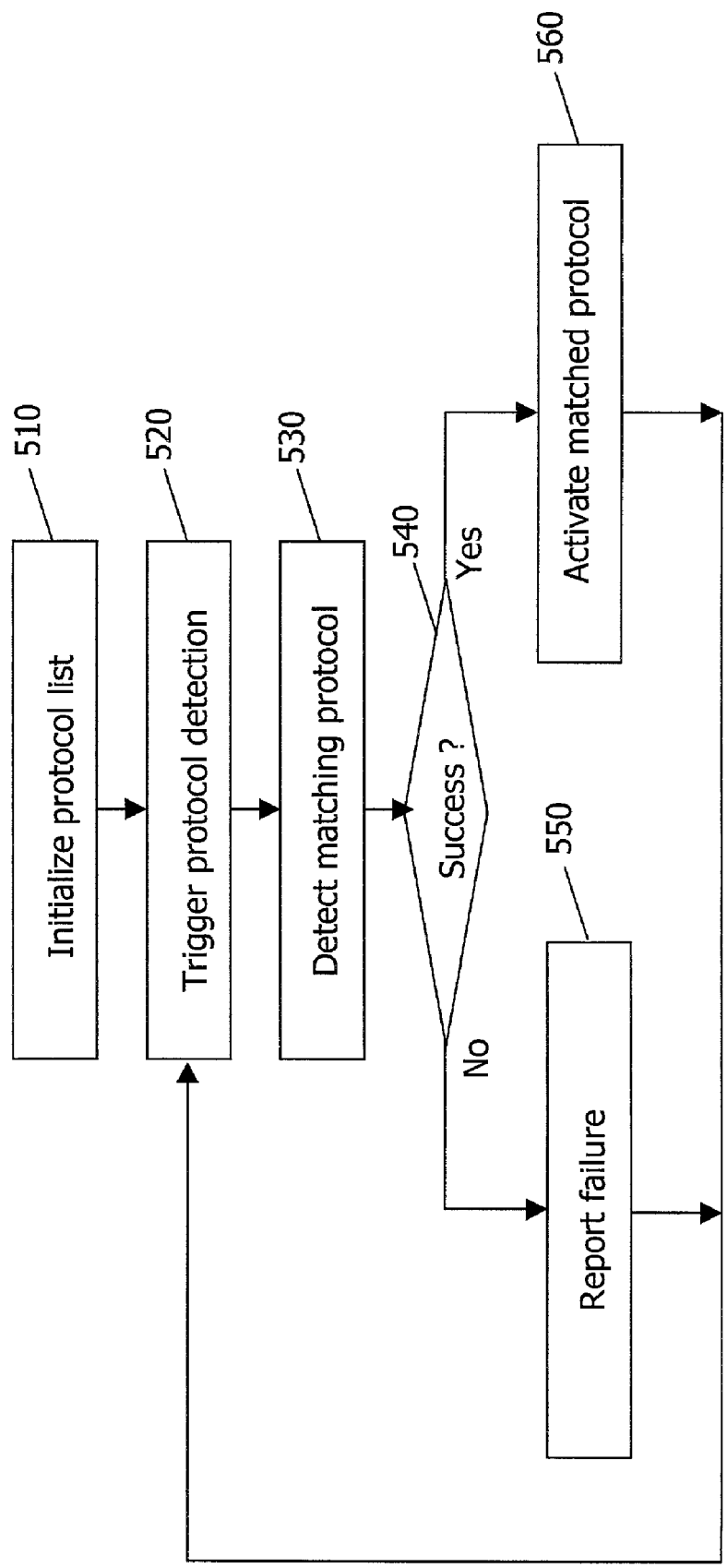
FIG. 5 is an example flowchart of a process, in which a matching DSL data link layer protocol is detected.

FIG. 5 is an exemplary flowchart for DSL data link layer protocol detection. An initiating protocol list is first initialized at act 510. The matching protocol detection mechanism 150 is triggered at act 520. Once triggered, the matching protocol detection mechanism 150 identifies, at act 530, a matching protocol to be used for establishing a DSL connection between the CPE 110 and the DSLAM 130. If a match is identified successfully, determined at act 540, the matched protocol is activated at act 560. A success may also be reported. If the match is not found, a failure is reported at act 550.

Figure 6:
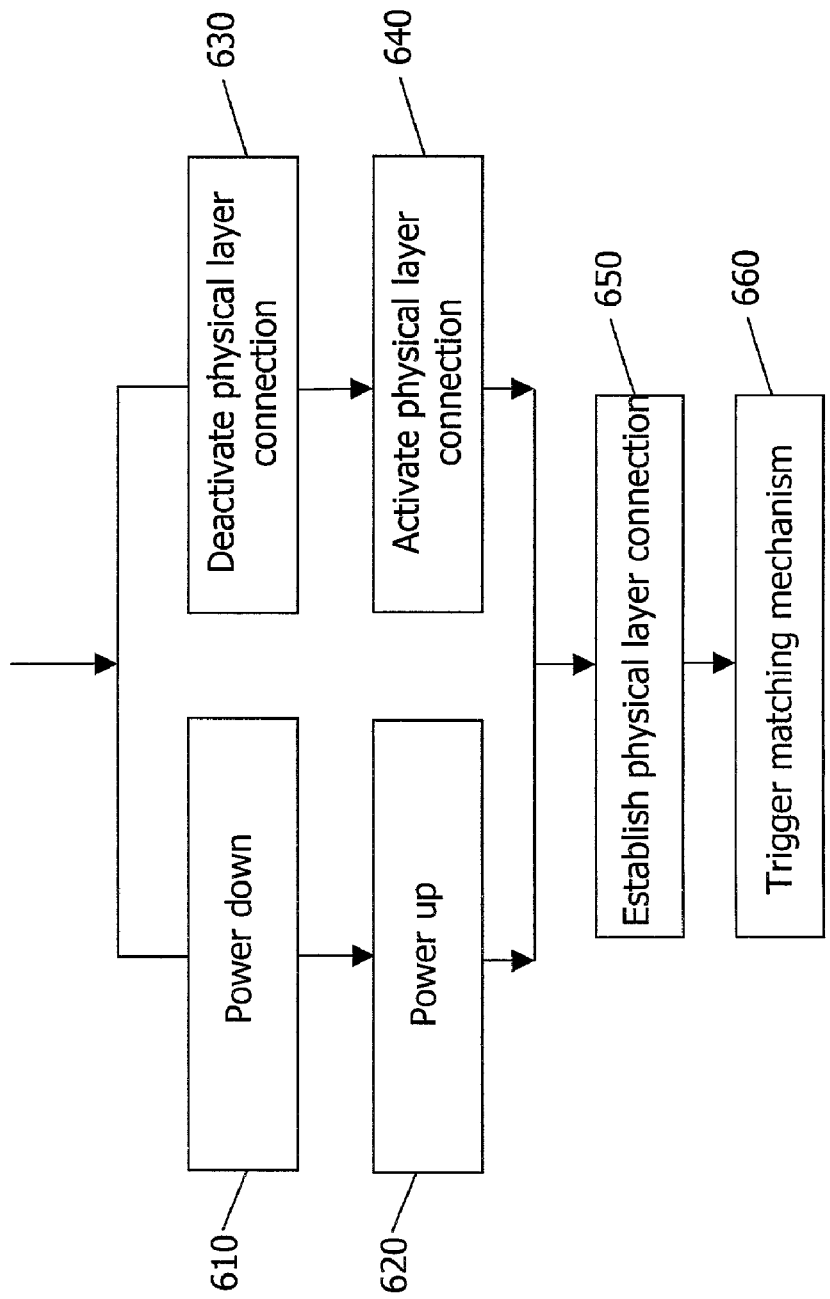
FIG. 6 is an example flowchart of a triggering mechanism that activates a matching-protocol detection mechanism.

FIG. 6 shows an exemplary flowchart of a process that triggers the matching-protocol detection mechanism 150. In FIG. 6, the trigger is activated whenever the physical layer connection is established (or re-established). There may be different reasons to establish (or re-establish) a physical layer connection. For example, when the power is brought back up (after the power is down), the physical layer connection needs to be re-established. When a physical layer is re-activated (after it is deactivated), the physical layer connection may also need to be re-established. That is, whenever a physical layer is reconnected, the matching protocol detection mechanism 150 is triggered so that any change in supporting DSL data link layer protocols may be detected accordingly.

In FIG. 6, two exemplary paths to establish a physical layer connection are described. One is the path of power down (which brings down the physical layer connection) and up. The other is the path of physical layer connection deactivation and re-activation. A physical layer connection may be deactivated for different reasons. For example, the central office may detect that a DSL connection is idle for a certain period of time. It is also possible that the central office may deactivate a DSL connection according to a usage limit specified in the timer profile of a DSL service. For example, a usage limit may specify a maximum two-hour continuous usage of a DSL connection.

In FIG. 6, the power is down at act 610 and back up at act 620. Alternatively, the physical layer connection is deactivated at act 630 and re-activated at act 640. The physical layer connection is established at act 650. Once the physical layer is reconnected, the matching-protocol detection mechanism 150 is triggered at act 660.

Figure 7:
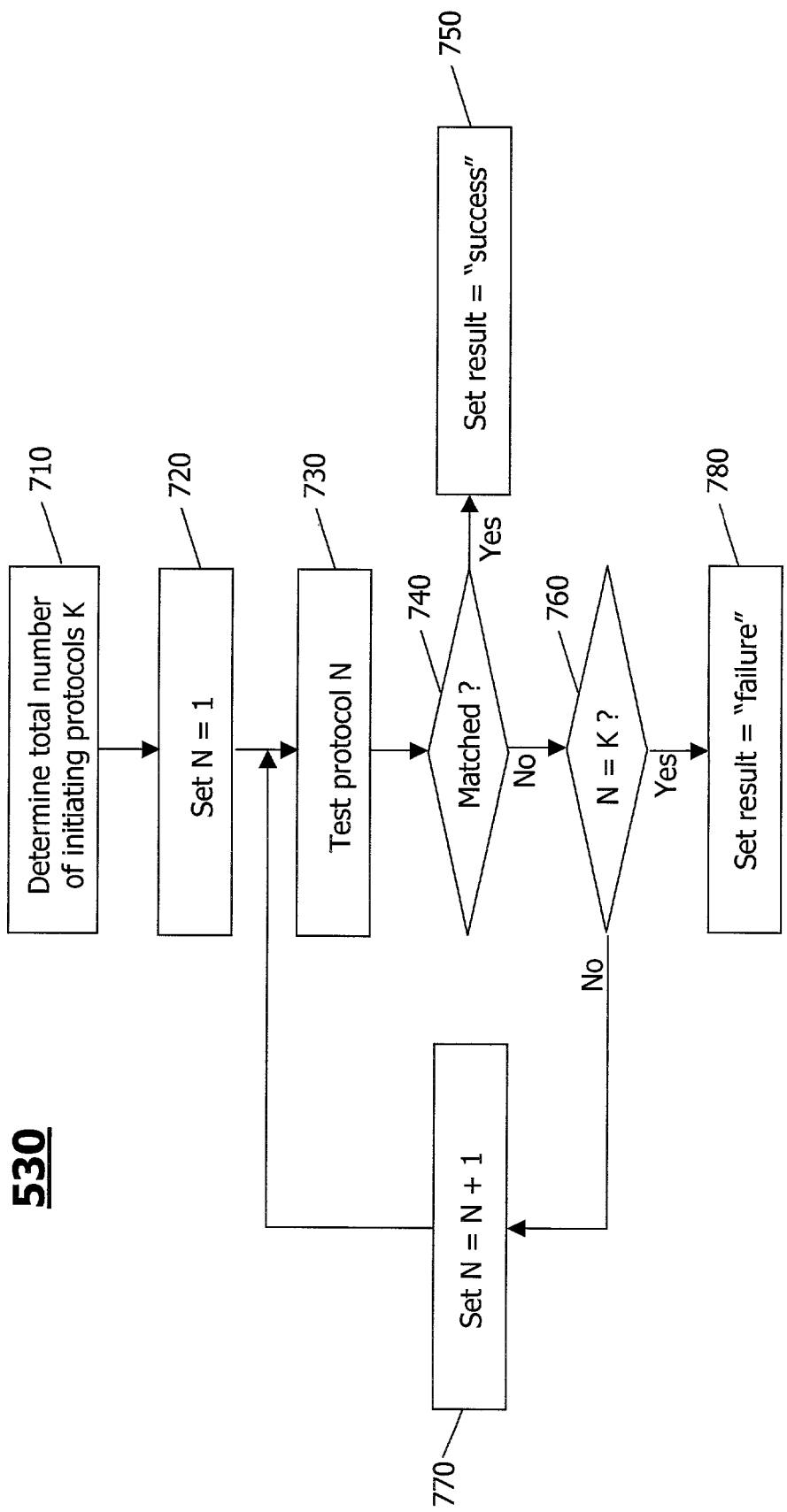
FIG. 7 is an example flowchart of a process, in which a matching protocol is detected.

FIG. 7 is an exemplary flowchart of a process, in which the protocols in an initiating protocol list 420 are tested in sequence to identify a matching protocol. The total number protocols (K) is first determined, at act 710, to control the total number protocols to be tested. The index N, based on which the next protocol being tested is determined, is initialized to 1 at act 720. The matching mechanism 440 tests each of the protocols in the initiating protocol list 420 in sequence starting from the top protocol in the list (i.e., stored in p[1]) until a match is found.

The protocol in the current index position (i.e., p[N]) is tested at act 730. If the current protocol is a match, determined at act 740, set, at act 750, the result of the matching process to be "success". If the current protocol is not a match, examine, at act 760, whether all the protocols in the initiating protocol list 420 have been tested. If there are more protocols to be tested, increment the index value N at act 770 and return to act 730 to test the next protocol. If all the protocols in the initiating protocol list 420 have been tested, set the result of the matching process to be "failure" at act 780.

Figure 8:
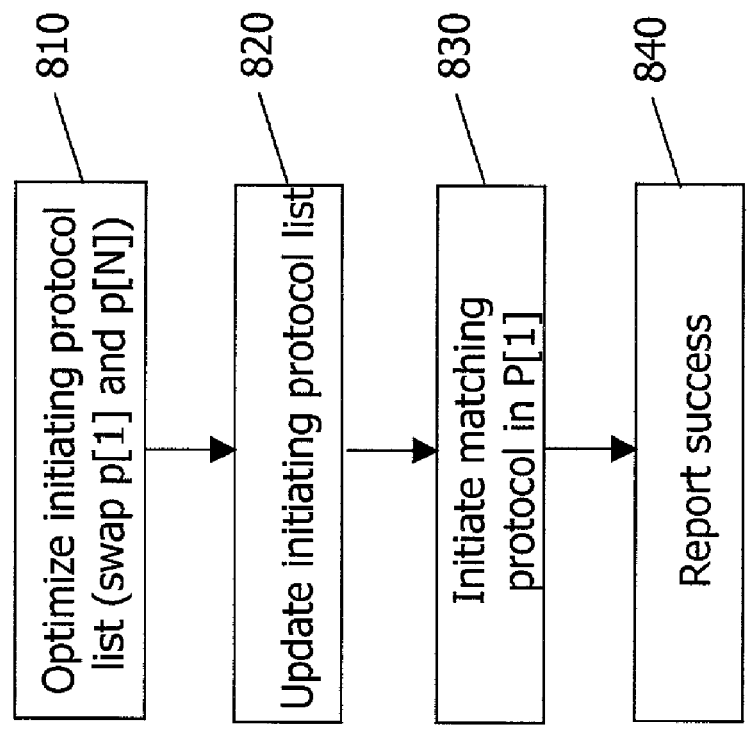
FIG. 8 is an example flowchart of a process, in which a detected matching protocol is activated.

FIG. 8 is an exemplary flowchart for the processing after a matching protocol is identified. Assume that the identified matching protocol is listed in location P[N] of the initiating protocol list 420, where N is the index value of the matching protocol. The existing initiating protocol list 420 is optimized, at act 810, through swapping the protocol stored in the first position of the list (i.e., P[1]) with the matching protocol stored in the current index position (i.e., P[N]). By doing so, the first position in the initiating protocol list 420 always stores the current matching protocol. The initiating protocol list 420 is then updated at act 820. This may include store the updated initiating protocol list 420 in the flash of the initiating device (the CPE 110 or the DSLAM 130). The detected matching protocol is then activated at act 830. The successful detection result is reported at act 840.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and, materials, such as are within the scope of the appended claims.

What is claimed is:

1. A method for detecting a matching DSL data link layer protocol, comprising:
   triggering a matching-protocol detection mechanism based on at least one condition;
   detecting a matching protocol from at least one initiating protocol, said matching protocol being supported and used by both a customer premise equipment and a digital subscriber line access module to establish a DSL connection;
   activating the matching protocol if the matching protocol is identified by said detecting;
   reporting a failure if the matching protocol is not found by said detecting;
   determining, prior to said triggering, said at least one initiating protocol supported by a device that is configured to be the initiating device of said matching-protocol detection mechanism; and
   initializing an initiating protocol list that records said at least one initiating protocols.

2. The method according to claim 1
   wherein said initiating device includes one of:
   said customer premise equipment; or
   said digital subscriber line access module.

3. The method according to claim 2
   wherein said detecting said matching protocol is performed according to an order in which said at least one initiating protocol are stored in the initiating protocol list.

4. A method for detecting a matching DSL data link layer protocol, comprising:
   triggering a matching-protocol detection mechanism based on at least one condition;
   detecting a matching protocol from at least one initiating protocol, said matching protocol being supported and used by both a customer premise equipment and a digital subscriber line access module to establish a DSL connection;
   activating the matching protocol if the matching protocol is identified by said detecting;
   reporting a failure if the matching protocol is not found by said detecting; and
   wherein said activating the matching protocol comprises:
   optimizing an initiating protocol list by storing said matching protocol at a first place in the initiating protocol list;
   updating the initiating protocol list stored in the flash of an initiating device; and
   initiating said matching protocol.

5. A computer readable medium having program code recorded thereon, such that when the code is read and executed by a computer, the computer is caused to detect a matching DSL data link layer protocol by:
   triggering a matching-protocol detection mechanism based on at least one condition;
   detecting a matching protocol from at least one initiating protocol, said matching protocol being supported and used by both a customer premise equipment and a digital subscriber line access module to establish a DSL connection;
   activating the matching protocol if the matching protocol is identified by said detecting;
   reporting a failure if the matching protocol is not found by said detecting;
   determine, prior to said triggering, said at least one initiating protocol supported by a device that is configured to be the initiating device of said matching-protocol detection mechanism; and
   initialize an initiating protocol list that records said at least one initiating protocols.

6. A computer readable medium having program code recorded thereon, such that when the code is read and executed by a computer, the computer is caused to detect a matching DSL data link layer protocol by:
   triggering a matching-protocol detection mechanism based on at least one condition;

detecting a matching protocol from at least one initiating protocol, said matching protocol being supported and used by both a customer premise equipment and a digital subscriber line access module to establish a DSL connection;

activating the matching protocol if the matching protocol is identified by said detecting;

reporting a failure if the matching protocol is not found by said detecting;

optimizing an initiating protocol list by storing said matching protocol at a first place in the initiating protocol list;

updating the initiating protocol list stored in the flash of an initiating device; and initiating said matching protocol.

* * * * *

UNITED STATES PATENT AND TRADEMARK OFFICE
CERTIFICATE OF CORRECTION

PATENT NO. : 7,006,452 B2
APPLICATION NO. : 09/861895
DATED : February 28, 2006
INVENTOR(S) : Lund It is certified that error appears in the above-identified patent and that said Letters Patent is hereby corrected as shown below:

In column 8, line 11, in Claim 2, after "claim 1" insert -- , --.

In column 8, line 15, in Claim 3, after "claim 2" insert -- , --.

Signed and Sealed this

Sixteenth Day of October, 2007

JON W. DUDAS
*Director of the United States Patent and Trademark Office*